United States Patent [19]

Nakamura et al.

[11] Patent Number: 5,240,367
[45] Date of Patent: Aug. 31, 1993

[54] FRONT LOADER ATTACHING AND REMOVING METHOD

[75] Inventors: Kentaro Nakamura; Masami Hirooka, both of Osaka, Japan

[73] Assignee: Kubota Corporation, Osaka, Japan

[21] Appl. No.: 785,771

[22] Filed: Oct. 31, 1991

[30] Foreign Application Priority Data

Nov. 20, 1990 [JP] Japan ............... 2-316359

[51] Int. Cl.⁵ ............................................. A01D 90/02
[52] U.S. Cl. ......................................... 414/786; 414/686
[58] Field of Search ............ 414/686, 786; 172/272, 172/273, 274

[56] References Cited

U.S. PATENT DOCUMENTS

| | | |
|---|---|---|
| 3,833,136 | 9/1974 | Spicer et al. .............. 414/686 |
| 4,345,870 | 8/1982 | Anderson et al. .......... 414/686 |
| 4,347,031 | 8/1982 | Friesen et al. ............ 414/686 |
| 4,383,793 | 5/1983 | Weir ........................ 414/686 |
| 4,548,543 | 10/1985 | Lenetz et al. ............ 414/686 |
| 4,637,772 | 1/1987 | Stumpe ..................... 414/686 |
| 4,755,101 | 7/1988 | Hamada et al. . |
| 4,793,764 | 12/1988 | Hamm ........................ 414/686 |
| 4,906,160 | 3/1990 | Kaufman et al. ............ 414/686 |

FOREIGN PATENT DOCUMENTS 238098  1/1965  Austria .................. 414/686

Primary Examiner—Michael S. Huppert
Assistant Examiner—William M. Hienz

[57] ABSTRACT

A loader having a working implement is removed from a tractor by placing the implement and a stand into contact with the ground as spaced apart from each other in the direction of advance of the tractor, disconnecting each of masts from a mount, subsequently advancing the tractor to raise the mast off the mount with the ground contact portion of the stand serving as a fulcrum and cause the implement and the stand to support the loader in a standing state, and thereafter retracting the tractor. The loader is attached to the tractor by advancing the tractor toward the loader in the standing state to set the mount in position in the rear of the mast, further advancing the tractor to incline the stand downwardly rearward and fit the mast into the mount from above, thereafter connecting the mast to the mount and removing the stand.

14 Claims, 9 Drawing Sheets

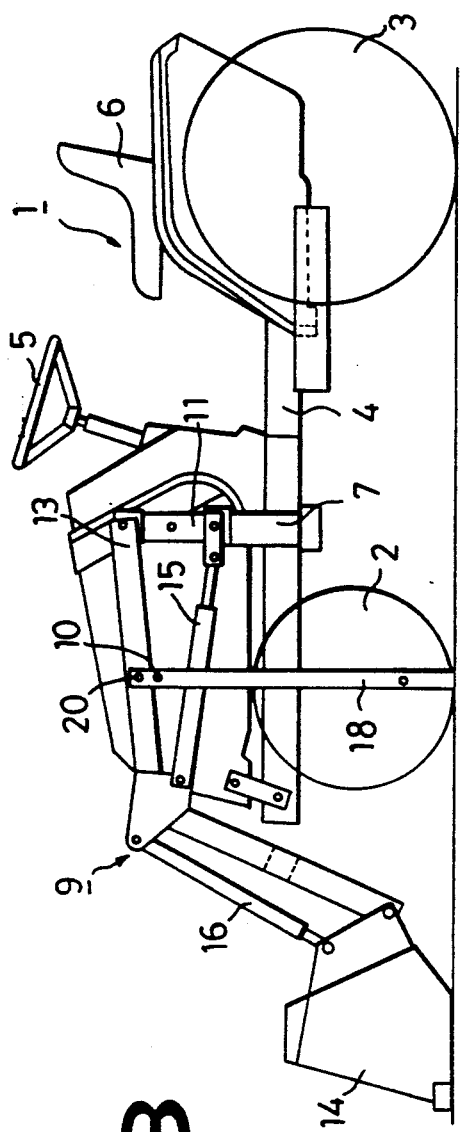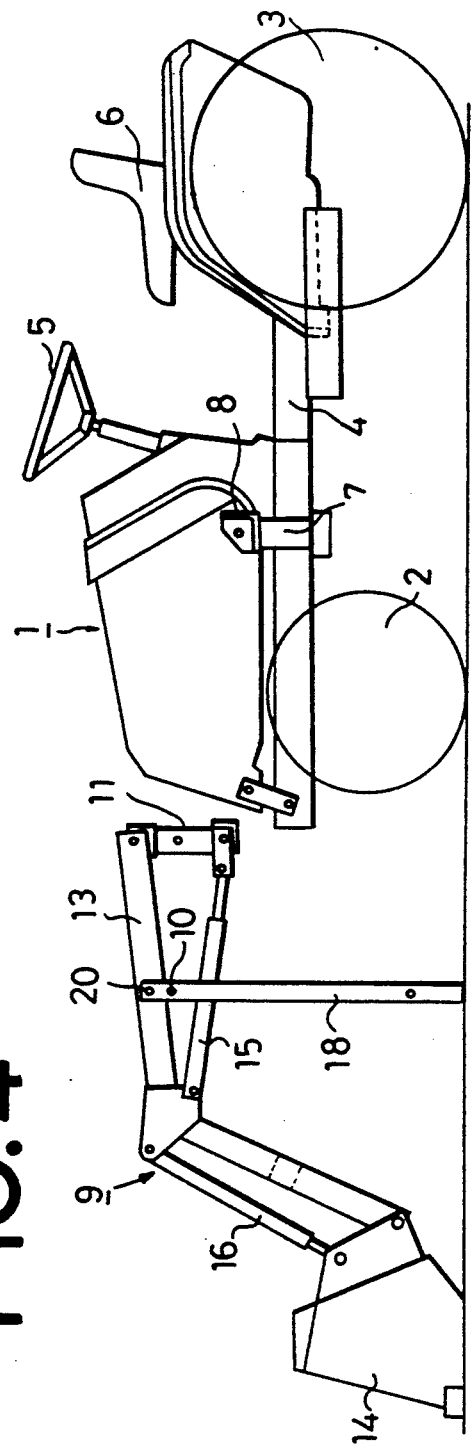

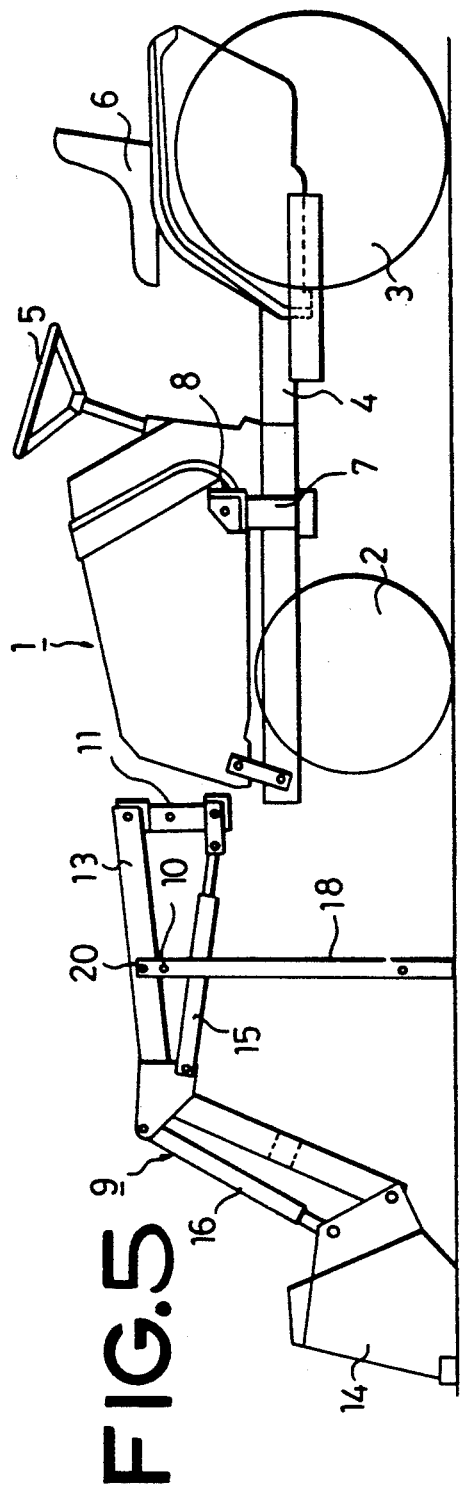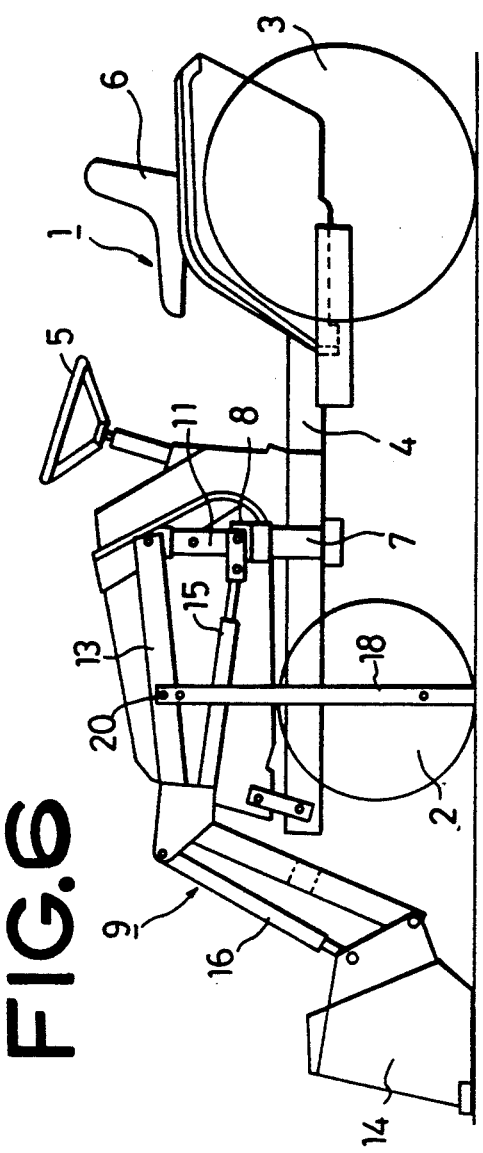

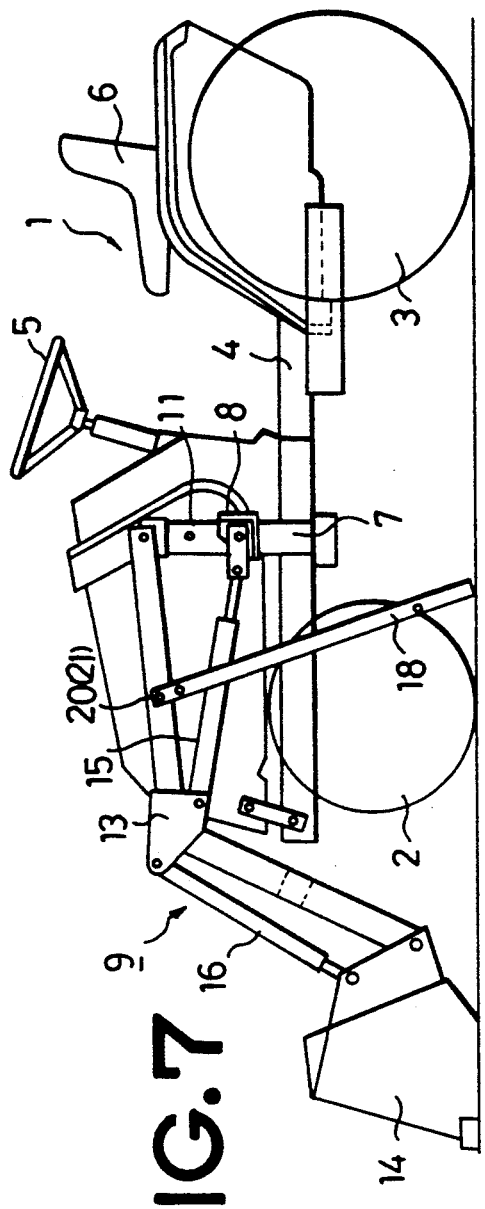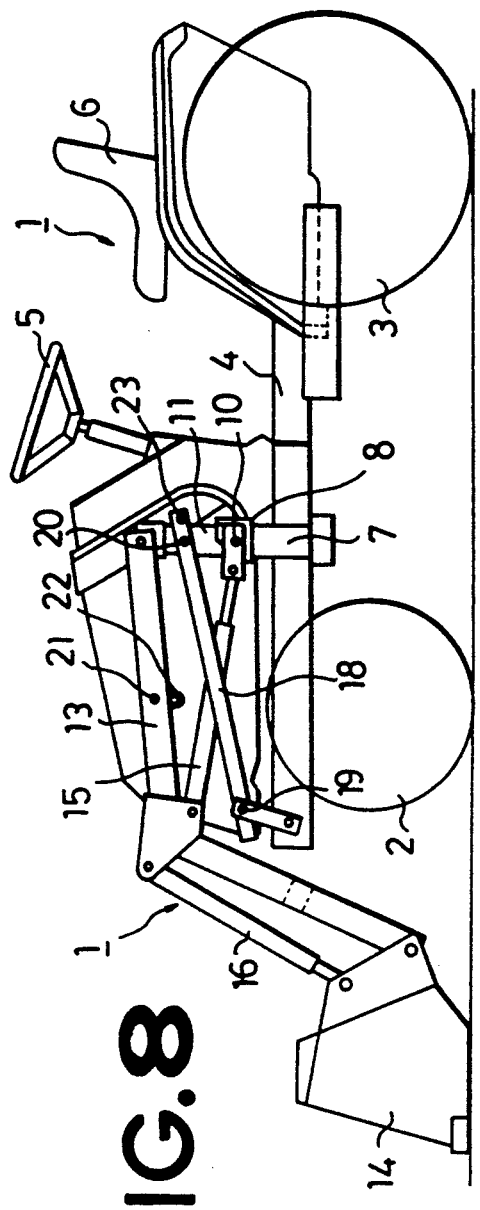

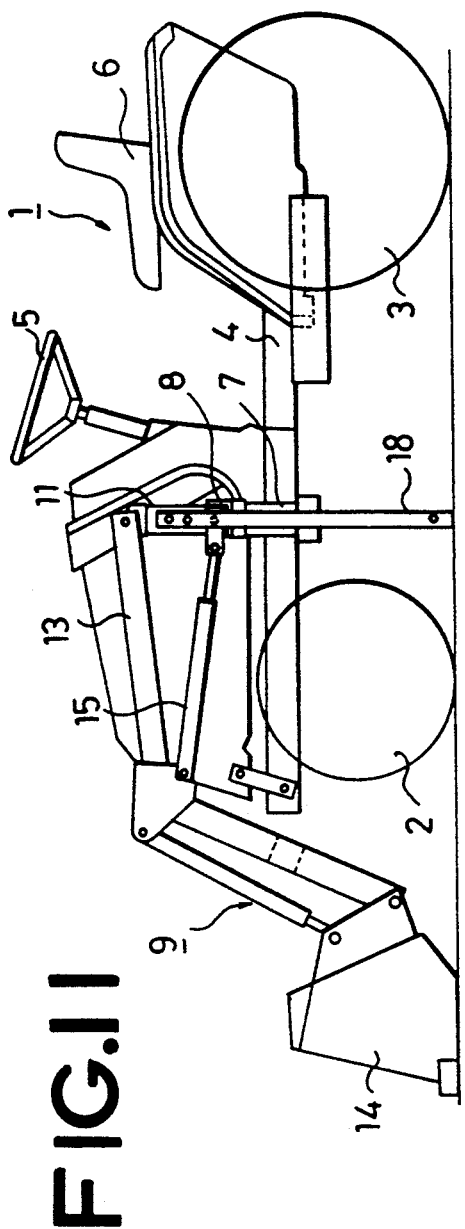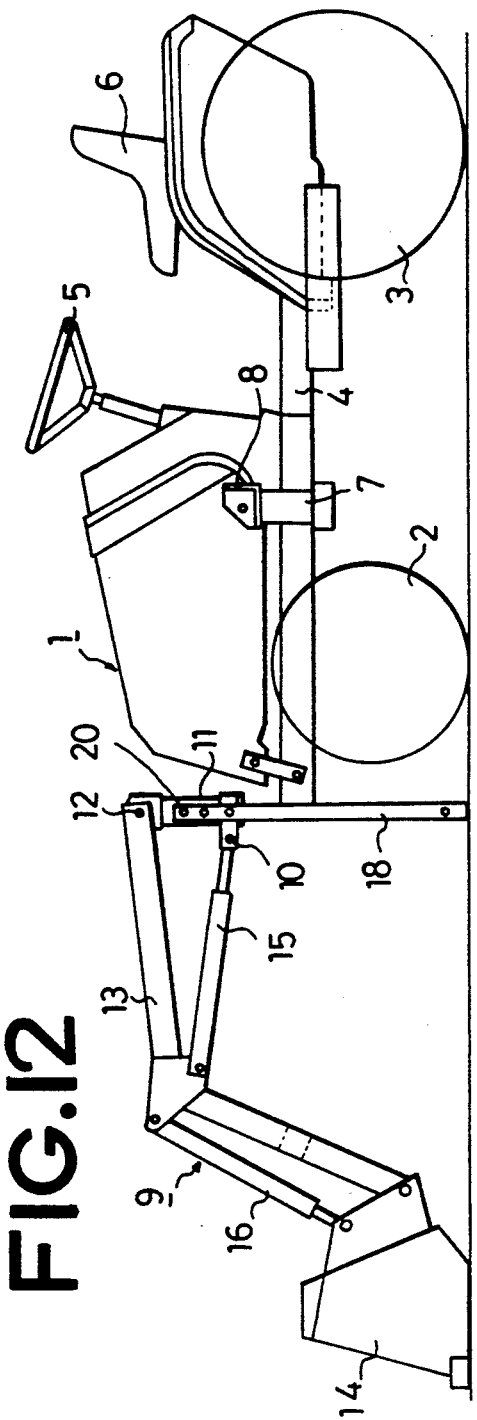

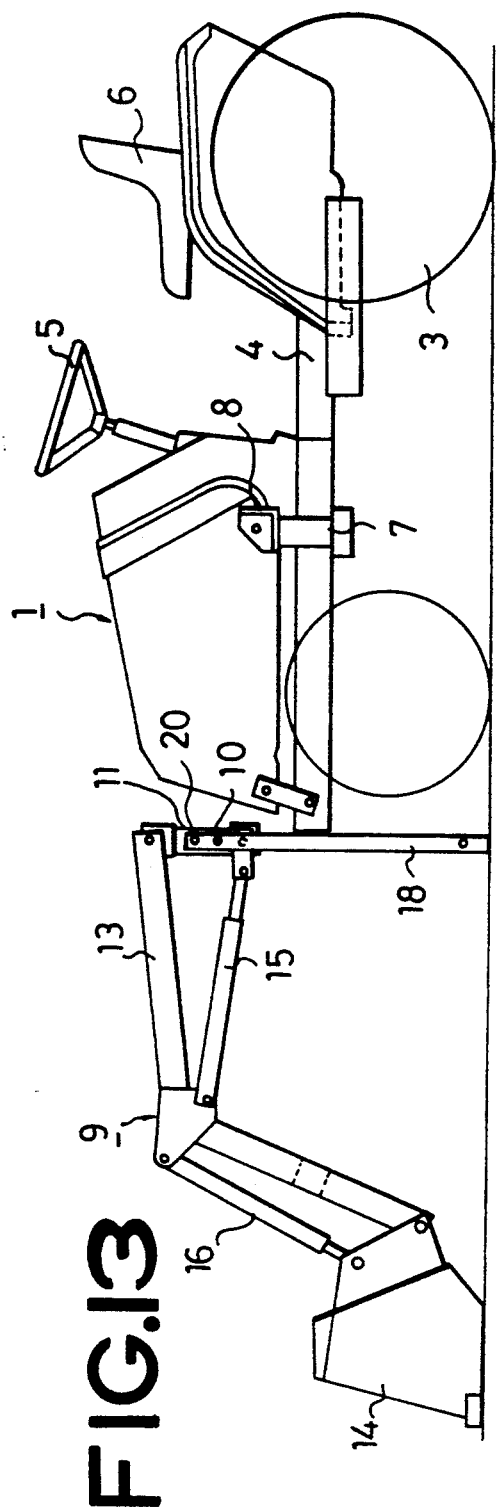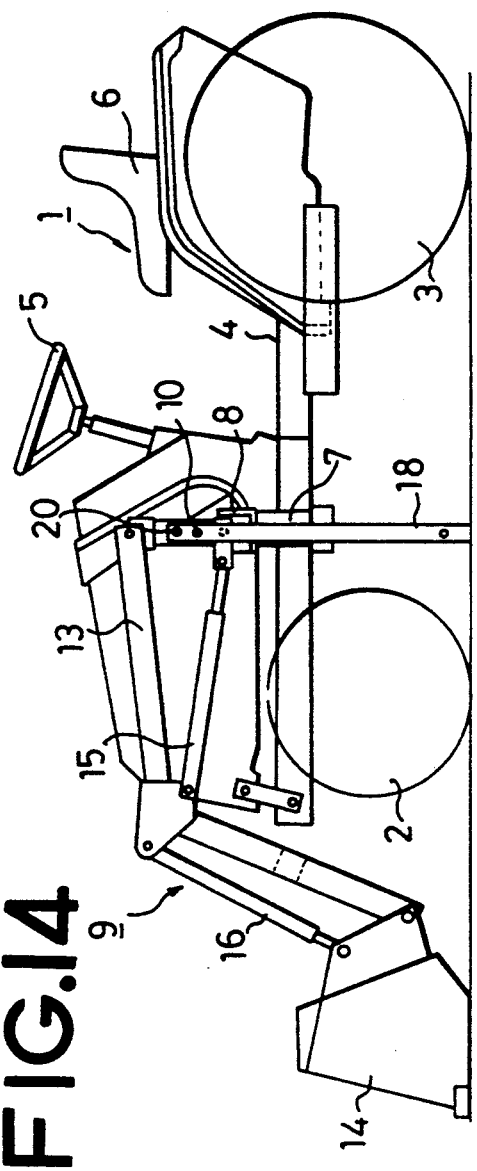

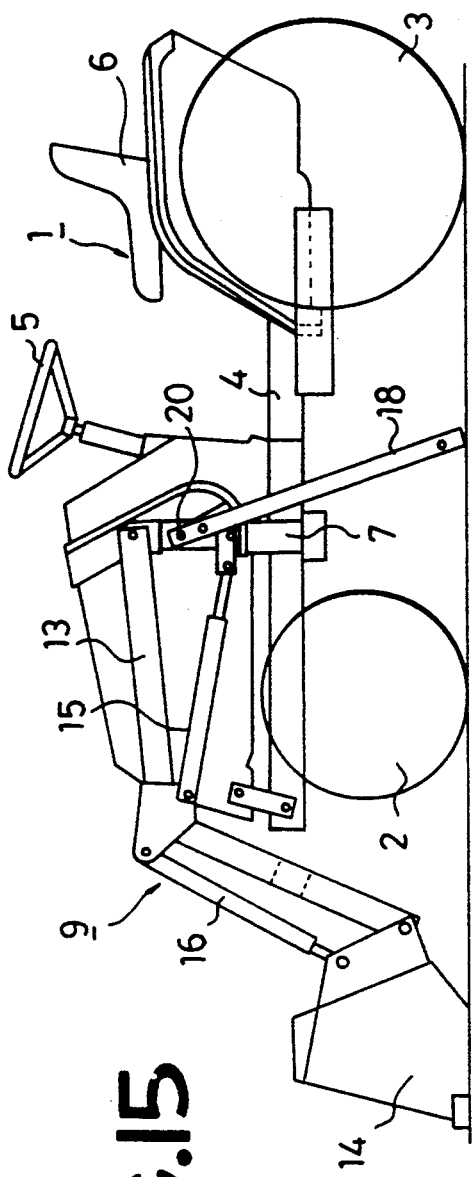
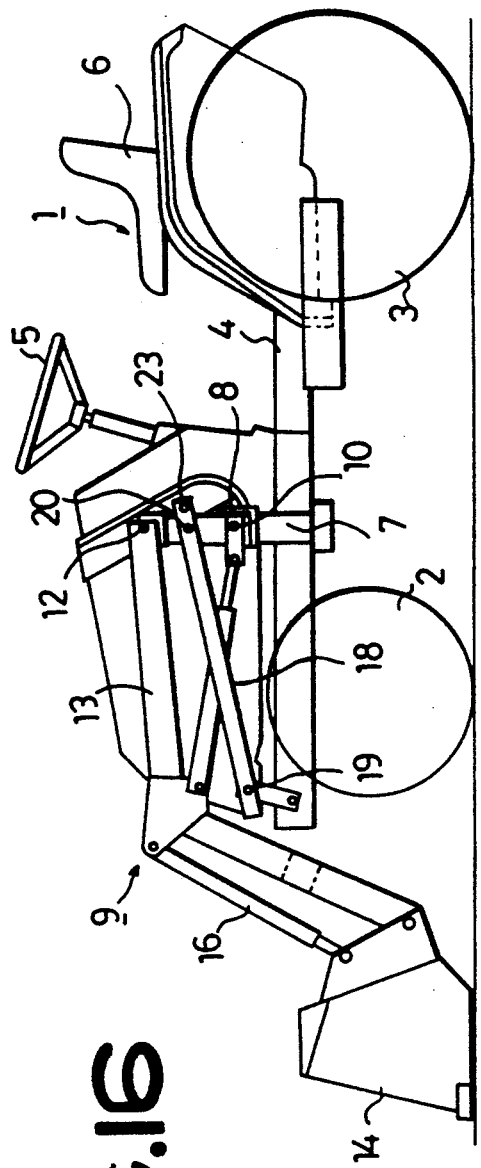

FRONT LOADER ATTACHING AND REMOVING METHOD

FIELD OF THE INVENTION AND RELATED ART STATEMENT

The present invention relates to a front loader attaching and removing method, and more particularly to a method of attaching a front loader to a wheeled tractor and removing the loader therefrom.

U.S. Pat. No. 4,755,101 discloses a method wherein a front loader includes masts and a pair of opposed booms having a working implement attached to the masts for movement in an upwardly and downwardly direction. The mats are attached to or removed from a tractor by connecting each mast to a mount on the tractor or disconnecting the mast from the mount. With this method, the front loader is removed from the tractor by operating a boom cylinder and bucket cylinder on the front loader to thereby raise the loader, subsequently attaching a stand to the loader to support the loader in a standing position, and thereafter retracting the tractor.

However, the loader is cumbersome to attach or remove from the tractor because the conventional method requires two different procedures, i.e., advance or retraction of the tractor, and operation of the boom cylinder and the like.

Further because the boom cylinder and the like are utilized, the hydraulic piping (couplers) must be separated after the loader has been removed from the tractor. The hydraulic piping therefore needs to be given an increased length or an allowance in view of the amount of movement of the loader and the tractor relative to each other. This entails the likelihood that the bent portion of the piping, which becomes larger, will interfere with an obstacle or the like while the loader is in use.

OBJECT AND SUMMARY OF THE INVENTION

An object of the present invention is to use a stand as a lever for attaching a front loader to a tractor and removing the front loader therefrom so that the front loader can be attached to or removed from the tractor without operating the boom cylinder or the like.

The present invention provides a method wherein a front loader including a pair of opposed masts and a pair of opposed booms having a working implement attached to the masts for movement in an upwardly and downwardly direction. The masts are attached to or removed from a tractor by connecting the pair of masts to a pair of opposed mounts fixed to the tractor, respectively, or disconnecting the masts from the mounts. To fulfill the above object, the method has the following feature.

According to the present invention, the loader is removable from the tractor by placing the working implement on the booms and a lower portion of a stand into contact with the ground as spaced apart from each other in the direction of advance of the tractor, the stand having an upper portion pivoted to the loader forwardly and rearwardly movably, disconnecting each mast from the mount, subsequently advancing the tractor to raise the mast off the mount with the ground contact portion of the stand serving as a fulcrum and cause the working implement and the stand to support the front loader in a standing state, and thereafter retracting the tractor, the front loader being attachable to the tractor by advancing the tractor toward the front loader in the standing state to set the mount in position in the rear of the mast, further advancing the tractor to incline the stand downwardly rearward and fit the mast into the mount from above, thereafter connecting the mast to the mount and removing the stand.

According to the present invention, the upper portion of the stand can be attached to a longitudinal intermediate portion of each of the booms of the front loader so as to be pivotally movable forward and rearward when the loader is to be attached to or removed from the tractor.

Alternatively, the upper portion of the stand can be attached to each of the opposed masts of the front loader so as to be pivotally movable forward and rearward when the loader is to be attached to or removed from the tractor.

Further according to the present invention, removably insertable stopper means can be provided between the front loader and the stand for holding the loader in the standing state.

Further according to the present invention, the stand may be a removable brace or removable connector bar of the front loader.

Further according to the present invention, the stand is a brace removed from the front loader, and the brace is in the form of a leg outwardly bent downward to avoid interference with the front wheel of the tractor when serving as the stand.

According to the present invention, therefore, the front loader can be attached to or removed from the tractor by advancing or retracting the tractor without necessitating the operation of the boom cylinder and bucket cylinder.

BRIEF DESCRIPTION OF THE DRAWINGS

The drawings show embodiments of the invention.

FIGS. 1 to 4 are side elevations showing a removing method stepwise as a first embodiment;

FIGS. 5 to 8 are side elevations showing an attaching method stepwise according to the first embodiment;

FIGS. 9 to 12 are side elevations showing a removing method stepwise as a second embodiment;

FIGS. 13 to 16 are side elevations showing an attaching method stepwise according to the second embodiment;

DESCRIPTION OF THE PREFERRED EMBODIMENTS

Figure 1:
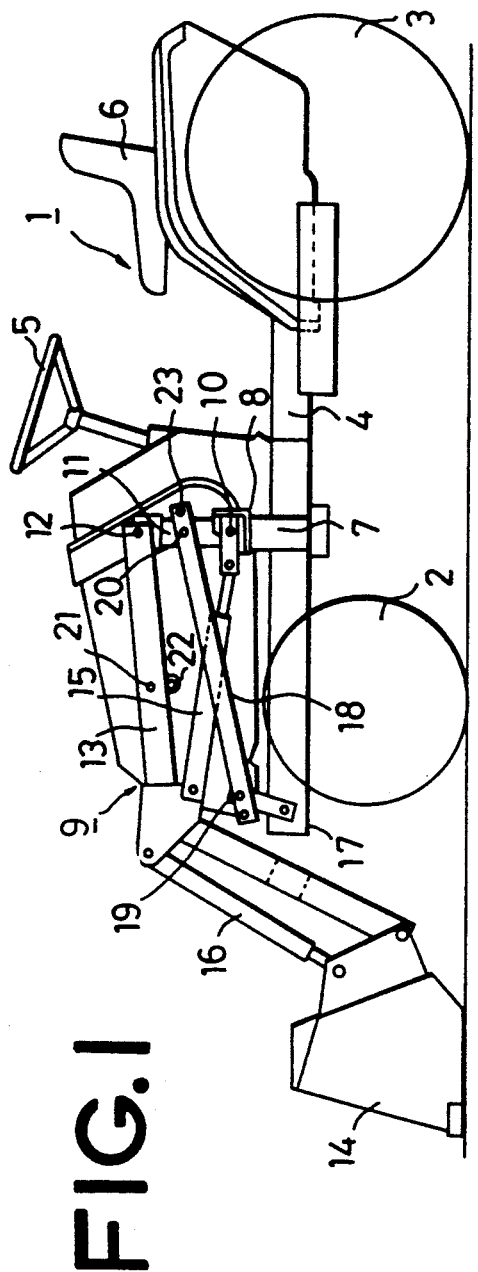

Embodiments of the present invention will be described below with reference to the drawings.

FIGS. 1 to 4 show a removing method as a first embodiment. A tractor 1 is of the two-axle four-wheel type having front wheels 2, rear wheels 3 and a body 4, which is provided with a steering wheel 5 and a driver's seat 6 in the rear thereof. Mounts 7 are fixedly provided on opposite sides of the tractor body 4 at a longitudinal intermediate portion thereof. Each of the mounts 7 has a mast fitting upper portion 8 which is U-shaped when seen from above and opened toward the front.

A front loader 9 comprises a pair of opposed masts 11 each removably fitted in the mast fitting portion 8 from above and disconnectably connected thereto with a connecting pin 10, a pair of opposed booms 13 movable upward and downward and pivoted to the upper ends of the respective masts 11 each with a pin 12, and a working implement 14 illustrated as a bucket and connected between the forward ends of the booms 13. The booms 13 are movable by a boom cylinder 15, and the working implement 14 by a bucket cylinder 16.

Furthermore, a stand or brace 18 is connected between an intermediate portion of each mast 11 and an axle frame 17 and disconnectable from these members by front and rear withdrawable pins 19, 20.

According to the first embodiment, each of the booms 13 is provided at a lengthwise intermediate portion thereof with a stand pivot hole 21 and a stand fixing hole 22. The brace has a pivot hole 23.

Figure 2:
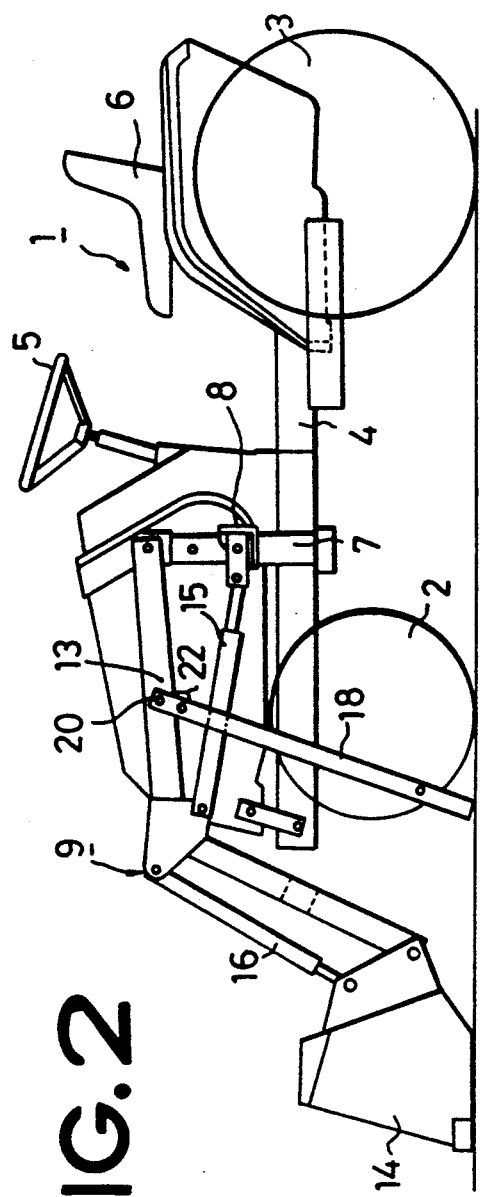
Figure 9:
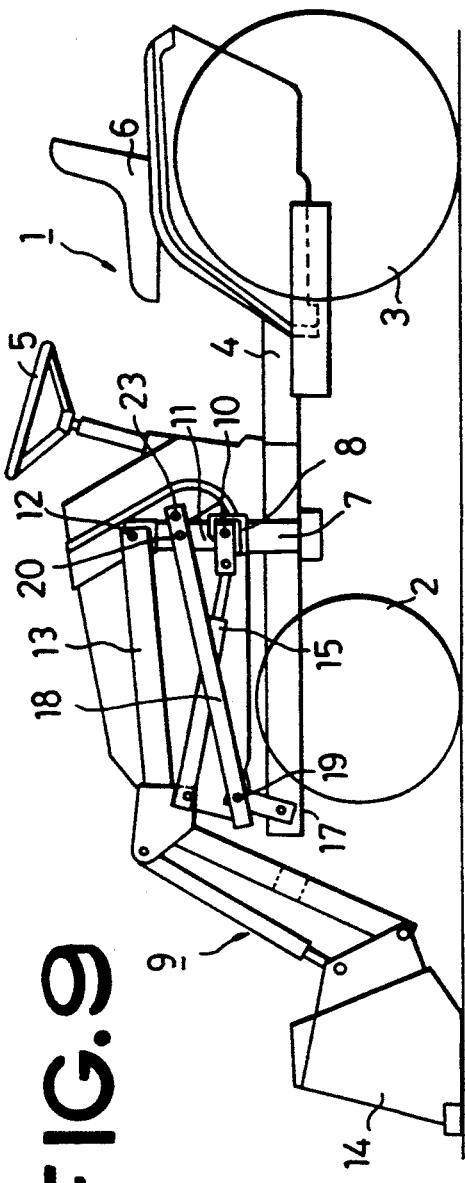
Figure 10:
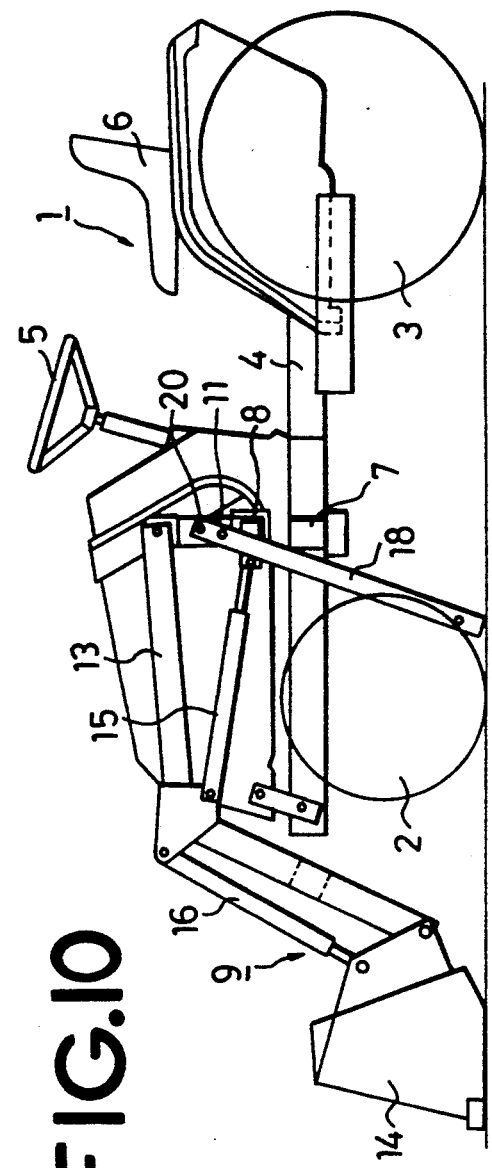

To remove the loader 9 from the tractor 1, the working implement 14 is placed on the ground, the cylinders 15, 16 are relieved of oil pressure, and each brace 18 is removed by withdrawing the pins 19, 20. With the pivot hole 23 of the brace 18 in register with the stand pivot hole 21 of the boom 13, one end of the brace 18 is movably attached to the boom with the pin 20. As shown in FIG. 2, the other end of the brace 18 is placed into contact with the ground as rearwardly spaced apart from the working implement 14. At this time, the upper portion of each of the pair of stands, i.e., of each brace 18, is attached to the above-mentioned lengthwise intermediate portion of the boom 13, and the brace 18 is inclined forwardly downward as illustrated out of alignment with a vertical line through the stand pivot hole 21. Further at this time, the couplers of the hydraulic piping for the cylinders 15, 16 are disconnected.

The tractor 1 is then advanced, pressing the mast fitting portions 8 against the respective mast 11, whereby each boom 13 is raised with the ground contact portion of the brace 18 serving as a fulcrum. This movement in turn positions the brace 18 vertically as seen in FIG. 3, and the mast 11 is raised off the fitting portion 8.

The connecting pin 10 now placed on the brace 18 is inserted through the stand fixing hole 22. Thus, the pin 10 and the hole serving as withdrawable stopper means restrain the brace 18 from pivotally moving forward or rearward, permitting the working implement 14 and each brace 18 to support the loader in a standing state. In this state, the tractor 1 is retracted, whereby the loader 9 is removed from the tractor 1.

FIGS. 5 to 8 show attaching steps.

The tractor 1 is advanced toward the front loader 9 in the standing state to set the mast fitting portions 8 of the mounts 7 in position in the rear of the respective masts 11. The connecting pin 10 serving as the stopper means is withdrawn to render each brace 18 pivotally movable forward or rearward. The tractor 1 is then further advanced, pressing each fitting portion 8 against the mast 11, whereby the brace 18 is moved about the pin 20 in the pivot hole 21 and rearwardly downwardly inclined to fit the mast 11 into the fitting portion 8 from above.

The brace 18 is thereafter removed from the boom 18 and installed in place on the loader with the pins 19, 20, the mast 11 is connected to the mount 7 with the connecting pin 10, and the hydraulic piping couplers are connected.

A second embodiment of the invention is shown in FIGS. 9 to 16, among which FIGS. 9 to 12 show a removing procedure, and FIGS. 13 to 16 show an attaching procedure. In either of these procedures, the second embodiment differs from the first embodiment in that the braces 18 serving as stands are attached to a pair of opposed masts 11. Throughout FIGS. 1 to 16, like parts are designated by like reference numerals.

Figure 17:
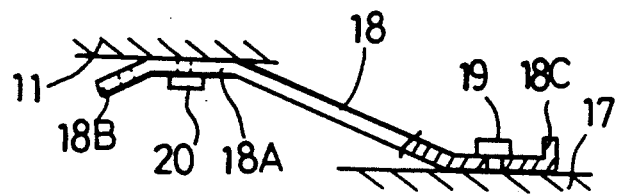
FIG. 17 is a plan view showing a brace as installed in place.
Figure 18:
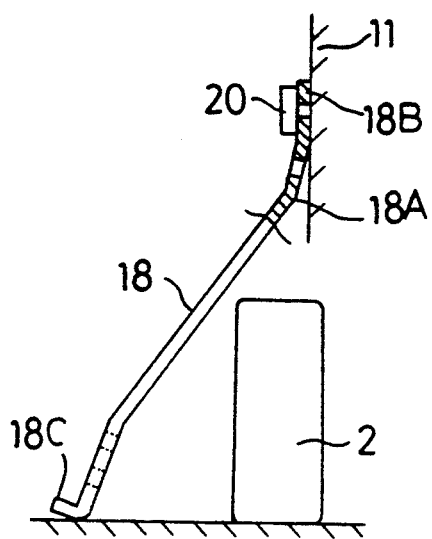
FIG. 18 is a side elevation showing the brace as used to serve as one of the stands.

FIGS. 17 and 18 show a brace 18 having an improved configuration for use as a stand.

The brace 18 has an attaching portion 18A for the mast 11, and another attaching portion 18B integral with the portion 18A and formed by bending at an angle therewith. When the brace 18 is removed by removing the pins 19, 20 and used as the stand by pivoting the upper portion of the brace 18 to the mast 11 with the pin 20 so as to be movable forward and rearward, the other attaching portion 18B is connected to the mast 11 as shown in FIG. 18. When the brace 18 is then placed on the ground, the brace is in the form of a leg outwardly bent downward to avoid interference with the front wheel 2. Preferably, the brace 18 has an L-shaped ground contact portion 18C as illustrated so as to produce an antislipping effect when used as the stand.

According to the embodiments described above, the loader can be removably attached to the tractor body 4 with a midmount mower or like working implement attached to the bottom thereof.

Besides the pair of braces 18 described, two superposed removable connecting bars interconnecting the upper portions of the masts 11 are usable as the stands.

According to the invention described above, the front loader is movable upward or downward with use of stands serving as levers when to be attached to or removed from the tractor, so that the loader is attachable or removable rapidly and easily by advancing the tractor.

What is claimed is:

1. A method of removing a front loader from a tractor, the front loader including masts and a pair of opposed booms having a working implement, said pair of opposed booms are attached to the masts for movement in an upward and downward direction, each of the masts being removably connectable to a mount fixed to the tractor, comprising the following steps:

positioning the working implement into contact with the ground;

positioning a lower portion of a stand into contact with the ground, said stand being spaced apart from said working implement in a longitudinal direction of the tractor, said stand having an upper portion pivoted to the loader in a forward and rearward direction;

releasing the masts from the mounts affixed to the tractor;

advancing the tractor to raise the masts off the mounts with the ground contact portion of the stand serving as a fulcrum;

supporting the front loader in a standing state on said working implement and the stand; and retracting the tractor.

2. The method as defined in claim 1, wherein the upper portion of the stand is attached to a longitudinal intermediate portion of each of the booms of the front loader so as to be pivotally movable forward and rearward when the loader is removed from the tractor.

3. The method as defined in claim 1, wherein the upper portion of the stand is attached to each of the masts of the front loader so as to be pivotally movable forward and rearward when the loader is removed from the tractor.

4. The method as defined in claim 1, wherein removably insertable stopper means are provided between the front loader and the stand for holding the loader in the standing state.

5. The method as defined in claim 1, wherein the stand is a removable brace of the front loader.

6. The method as defined in claim 1, wherein the stand is a brace removed from the front loader, and the brace is in the form of a leg outwardly bent downward to avoid interference with a front wheel of the tractor when serving as the stand.

7. The method of claim 1, wherein the stand is a removable connector bar interconnecting the masts.

8. A method of attaching a front loader to a tractor, the front loader including masts and a pair of opposed booms having a working implement, said pair of opposed booms are attached to the masts for movement in an upward and downward direction, each of the masts being removably connectable to a mount fixed to the tractor, comprising the following steps:

advancing the tractor towards the front loader in a standing state with a working implement and a stand being in contact with a ground surface for supporting the front loader relative to the ground surface, said stand being spaced apart from the working implement in a longitudinal direction of the tractor with one end being pivotally connected to the front loader and a second end being in contact with the ground surface;

positioning the masts in operative, connecting relationship to the mounts affixed to the tractor;

further advancing the tractor to lower the masts to be in engagement with the mounts affixed to the tractor with the ground contacting portion of the stand serving as a fulcrum;

connecting the masts to the mounts affixed to the tractor; and removing the stand.

9. The method according to claim 8, wherein the upper portion of the stand is attached to a longitudinal intermediate portion of each of the booms of the front loader so as to be pivotally movable forward and rearward when the front loader is attached to the tractor.

10. The method according to claim 8, wherein the upper portion of the stand is attached to each of the masts of the front loader so as to be pivotally movable forward and rearward when the loader is attached to the tractor.

11. The method according to claim 8, wherein removably insertable stopper means are provided between the front loader and the stand for holding the loader in the standing state.

12. The method according to claim 8, wherein the stand is a removable brace of the front loader.

13. The method according to claim 8, wherein the stand is a removable connector bar interconnecting the masts.

14. The method according to claim 8, wherein the stand is a brace removed from the front loader, and the brace is in the form of a leg outwardly bent downward to avoid interference with a front wheel of the tractor when serving as the stand.

* * * * *